No. 804,338. PATENTED NOV. 14, 1905.
A. E. PIKE.
JAR, BOTTLE, AND OTHER VESSEL.
APPLICATION FILED OCT. 6, 1904.

WITNESSES.
Emily Knight.
Grace Ogle.

INVENTOR
A. E. Pike.
by W. S. Evans
ATTORNEY.

UNITED STATES PATENT OFFICE.

ALFRED EDRIDGE PIKE, OF BRISLINGTON, ENGLAND, ASSIGNOR OF ONE-HALF TO JOHN LEE OSBORN, OF BRISTOL, ENGLAND.

JAR, BOTTLE, AND OTHER VESSEL.

No. 804,338.   Specification of Letters Patent.   Patented Nov. 14, 1905.

Application filed October 6, 1904. Serial No. 227,422.

*To all whom it may concern:*

Be it known that I, ALFRED EDRIDGE PIKE, a subject of the King of Great Britain and Ireland, residing at Carfax, Grove Park, Brislington, in the county of Somerset, England, have invented certain new and useful Improvements Relating to Jars, Bottles, and other Vessels, of which the following is a specification.

The invention relates to hermetically-sealed jars, bottles, and other vessels for the preservation of foods, tobacco, and the like.

The invention generally has for its objects to provide simple and inexpensive means for the hermetic closure of vessels.

According to the invention the edge of the mouth of the jar, bottle, or other vessel is provided with an outwardly-protruding jointing-rim of a shape corresponding to a jointing flange or surface around the edge of the annular rim of the cover. The edge of the mouth of the jar, bottle, or other vessel, moreover, is inclined inwardly upon the outside toward the protruding rim of jointing-surface aforesaid for the reception of a jointing-ring, of rubber or other material, which when placed in position has its upward edge slightly protruding outwardly, so that when the cover is placed in position the jointing flange or surface thereof comes to lie upon the edge of the ring and forces the ring upon the jointing-rim of the jar, bottle, or other vessel in the manner hereinafter described. The annular rim of the cover may be advantageously of slightly conical or tapered form, so that the cover may be drawn into the position in which its jointing flange or surface rests with pressure upon the ring of jointing material, or instead the annular rim of the cover may be of true cylindrical shape, and the crown of the cover may be corrugated, so as to permit of a slight circumferential or diametrical extensibility, by which pressure is applied between the annular rim of the cover and the edge of the jar or vessel sufficient to maintain it in position thereon.

The invention is illustrated in the accompanying drawings, in which—

Figure 1:
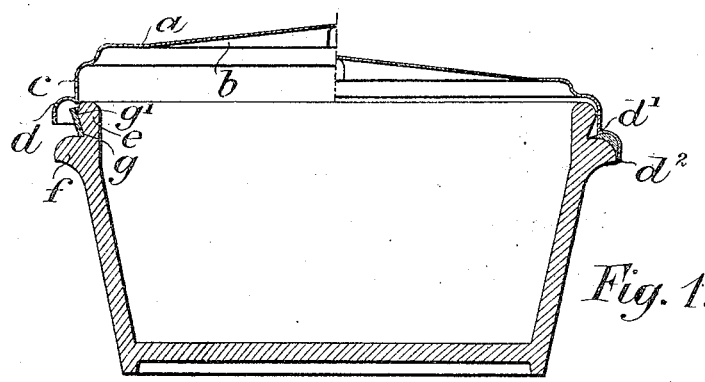
Figure 2:
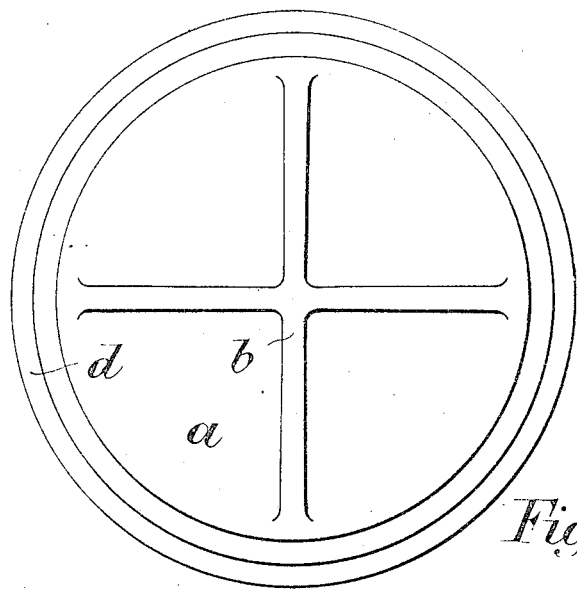
Figure 3:
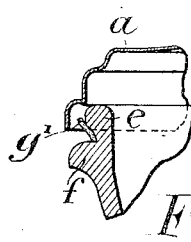
Figure 4:
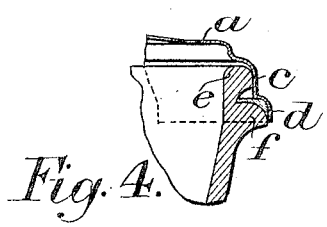

Figure 1 represents a sectional elevation of a jar or vessel provided with a cover and joint according to the invention, the cover being shown in two positions, one of which is the position it occupies before the vessel is sealed and the other in the position it occupies after the vessel is sealed. Fig. 2 is a top plan view of the cover. Figs. 3 and 4 are sectional views of a modification.

In carrying the invention into effect, as illustrated in the accompanying drawings, I provide a cover $a$, of tin, metal, or other suitable material, which is advantageously stamped with circular corrugations $b$ in the crown, as illustrated, and the annular rim $c$ is provided with a jointing-flange $d$, of curved form. The flange $d$ is made of such shape in relation to the curved edge of the jointing-rim that the jointing-ring, which comes to lie between, is pressed on two circumferential lines—namely, at $d'$ and at $d^2$—by which thus a double air-tight joint is provided. The edge $e$ of the jar is provided with an annular jointing-rim $f$, having its edge curved to a form corresponding to that of the jointing-flange $d$ of the cover $a$. The edge of the jar $e$ is inclined inwardly at a suitable angle, as illustrated in Fig. 1, or at a suitable curve, as illustrated in Figs. 3 and 4, to receive a ring $g$ of india-rubber or other jointing material whose upper and outer extending edge $g'$, when the cover $a$ is applied in position upon the jar, is depressed so that the ring $g$ comes to lie beneath the jointing-flange $d$ of the cover and upon the curved edge of the jointing-rim $f$, so that the two joints aforesaid are made.

By the employment of a corrugated cover or of a cover having alternate ridges provision is made for the circumferential or diametric extensibility of the annular rim $c$ of the cover, by which the cover may be readily mounted in position and pressure applied against the edge $e$ of the jar and so that thus the jointing-flange $d$ is maintained with pressure upon the jointing-ring $g$, and an absolutely air-tight joint is thus insured.

Instead of providing a corrugated cover the crown of the cover may be left plain and the annular rim $c$ may be provided tapered or conical in form, so that thus the lower extremity of the annular rim may pass down the outer face of the edge $e$ of the jar for the same purpose of insuring that the jointing-flange $d$ shall be applied with pressure upon the jointing-ring $g$.

It is obvious that the invention is applicable to the covers or stoppers of bottles as well as jars and other vessels and that the jointing-flange *d* may be provided of a form different from that of the illustrated construction.

What I claim as my invention, and desire to secure by Letters Patent, is—

1. In a jar, bottle, or other vessel, a peripheral jointing rim or surface, a peripheral flange above said jointing rim or surface, a flat-sectioned ring supported by said flange in a substantially vertical position for bedding upon the peripheral jointing rim or surface upon the closure of the said vessel, and a cover therefor, substantially as described.

2. In a jar, bottle, or other vessel, a peripheral jointing rim or surface, a peripheral flange above said jointing rim or surface, a flat-sectioned ring supported by said flange in a substantially vertical position and protruding beyond it, a cover, said cover being adapted to engage with the outwardly-projecting part of said ring for causing it to bed upon the peripheral jointing rim or surface, substantially as described.

3. In a jar, bottle, or other vessel, a peripheral jointing rim or surface, a peripheral flange above said jointing rim or surface, a flat-sectioned ring supported by said flange and protruding beyond it, a cover, said cover being adapted to engage with the outwardly-protruding part of said ring and having a curved jointing-flange by which a tight joint may be made on two circumferential lines upon the jointing rim or flange, substantially as described.

4. In a jar, bottle, or other vessel, a peripheral jointing rim or surface, a peripheral flange above said jointing rim or surface, the outer face of said flange being angularly disposed, a flat-sectioned ring supported upon the angularly-disposed outer face of said flange so as to be directed outwardly and upwardly, and a cover for engaging with the outward and upwardly directed part of said ring, substantially as described.

5. In a jar, bottle, or other vessel, a peripheral jointing rim or surface of curved form, a peripheral flange above said jointing rim or surface, a flat-sectioned ring in a substantially vertical position, a cover for said vessel, and a jointing-flange of curved form upon said cover said jointing-flange being adapted on closure of the cover to contact with the said ring, and to compress it against the jointing rim or surface of the jar, bottle or other vessel on two circumferential lines, substantially as described.

In testimony whereof I have signed my name to this specification in the presence of two subscribing witnesses.

ALFRED EDRIDGE PIKE.

Witnesses:
JOHN LEE OSBORN,
JAMES HARRY WALKER MAUDE.